April 5, 1932.   R. HALL   1,852,516
EXPANSION JOINT
Filed April 2, 1929   2 Sheets-Sheet 1
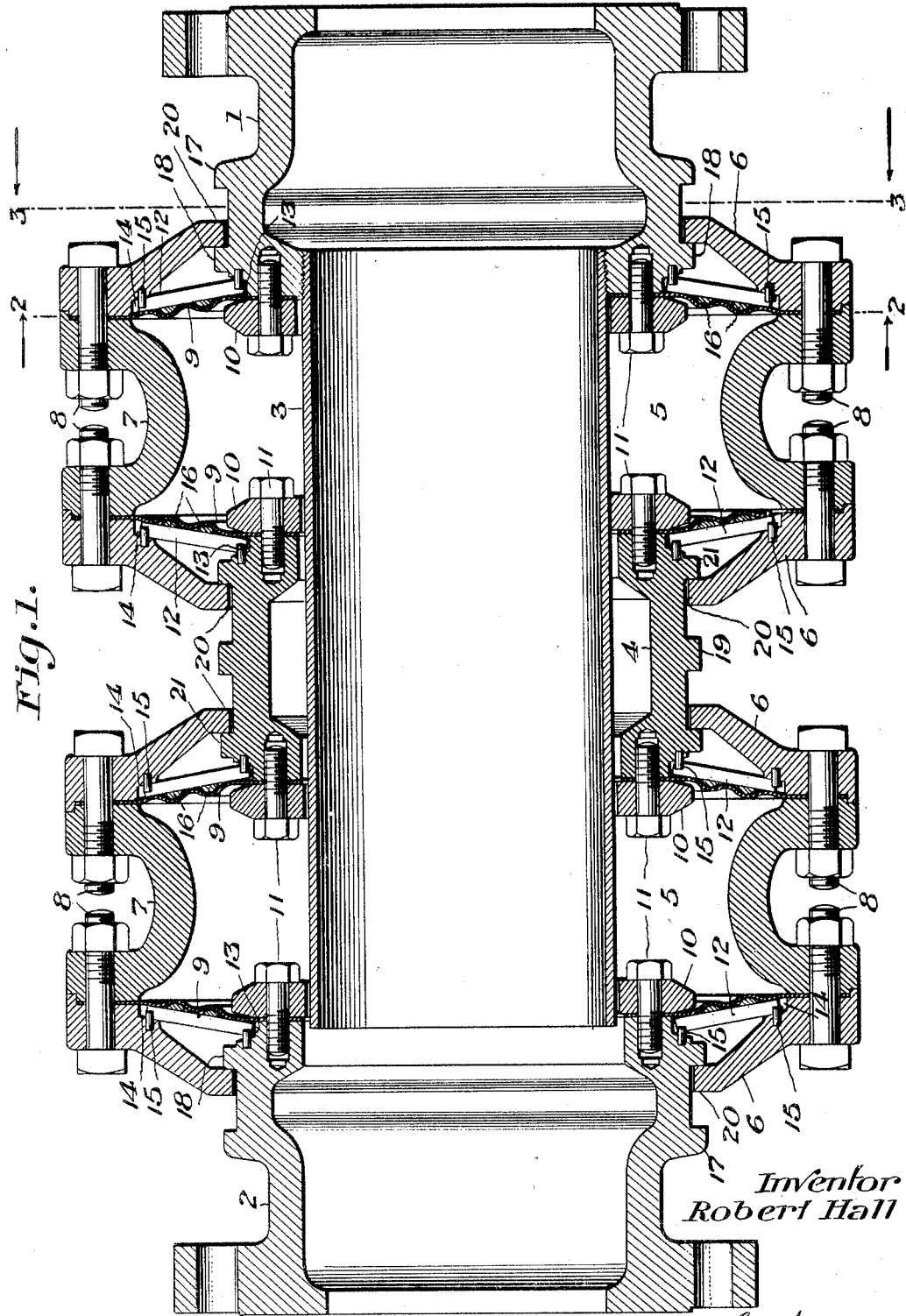
Inventor
Robert Hall
By Morrison, Kennedy + Campbell Attys.

April 5, 1932.  R. HALL  1,852,516
EXPANSION JOINT
Filed April 2, 1929  2 Sheets-Sheet 2
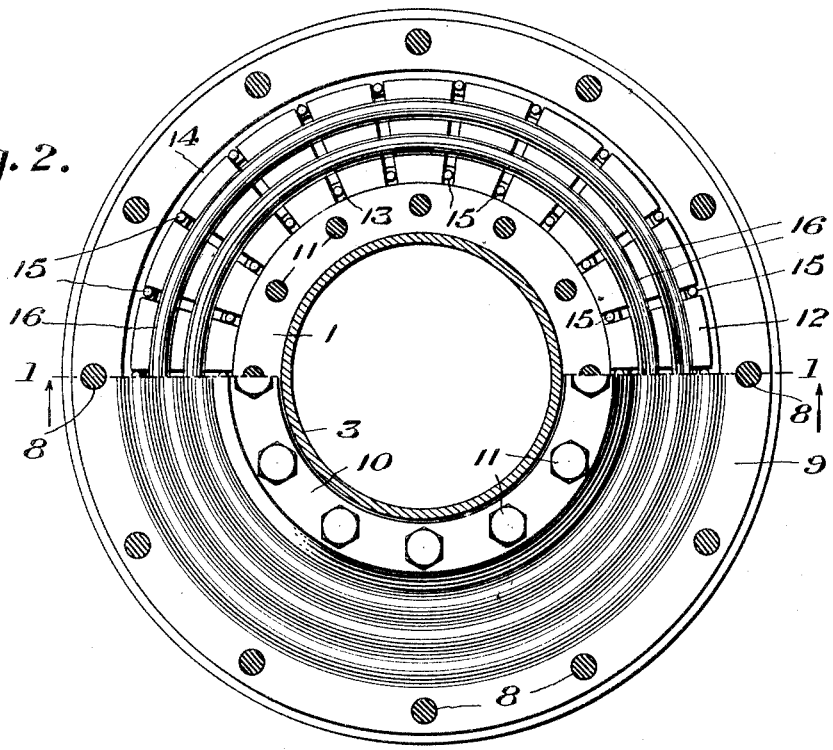
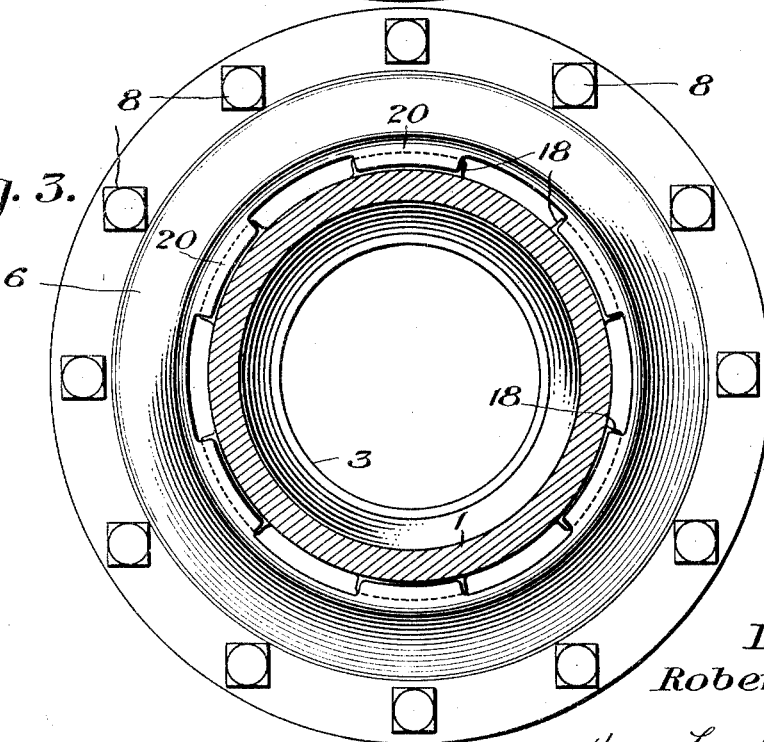
Inventor
Robert Hall
By Morrison, Kennedy, Campbell Attys Patented Apr. 5, 1932

1,852,516

UNITED STATES PATENT OFFICE

ROBERT HALL, OF LOCKPORT, NEW YORK, ASSIGNOR TO AMERICAN DISTRICT STEAM COMPANY, OF NORTH TONAWANDA, NEW YORK, A CORPORATION OF NEW YORK

EXPANSION JOINT

Application filed April 2, 1929. Serial No. 351,988.

This invention relates to expansion joints, and particularly to that type of joint in which plastic packings are eliminated and in which flexible diaphragms are provided to compensate for the expansion of pipe lines subjected to varying temperatures.

In providing adequate means for taking care of the expansion and contraction of pipe lines which are subjected to considerable internal pressure and exceedingly high temperature, it has heretofore been necessary to provide expansion joints interposed at definite points along the length of the pipe, with the result that where the pipe is of considerable length, a great many of the joints must be installed and provision made for their ready accessibility. Where the pipe line is located underground, and a number of expansion joints are provided at different points in the length thereof, it is, of course, essential that these be located in suitable and accessible places, and this can only be done at great expense of installation and maintenance.

It is an object of this invention to provide an expansion joint in which the use of plastic packings is eliminated and which includes a plurality of flexible diaphragms so arranged that any number of diaphragms may be combined in a series, means being provided to limit the motion of each of the diaphragms to prevent overstraining them and to distribute the expansion or contraction more or less equally on all of the diaphragms of the series.

Another object of the invention is to provide an expansion joint having flexible diaphragms with backing plates for the diaphragms, and reinforcing means interposed between the backing plates and the diaphragms to relieve the diaphragms of the strain to which they are subjected by reason of the variable formation of the backing plates while the pipe line is either expanding or contracting.

Other and further objects of the invention, as well as the many advantages thereof, will in part be obvious and in part be more fully brought out as the description proceeds.

In the accompanying drawings, I have illustrated a practical embodiment of my invention; but it is to be understood that I am not limited to the details of construction therein disclosed but, on the other hand, the invention is susceptible of a wide range of modification and equivalency, as will be readily appreciated by those skilled in the art.

In these drawings:

Fig. 1 is a longitudinal sectional view of an expansion joint according to my invention, this view being taken substantially on line 1—1 of Fig. 2;

Fig. 2 is a vertical sectional view, taken along line 2—2 of Fig. 1; and

Fig. 3 is a sectional view, taken on line 3—3 of Fig. 1.

Referring, now, to the drawings, the reference-numeral 1 indicates a flanged pipe stud which constitutes a connecting member to the incoming pipe (not shown). The reference-numeral 2 indicates a similar flanged pipe stud which constitutes the connecting member for connecting the joint to an outgoing pipe (not shown). A pipe-section 3 is rigidly secured at one end to the pipe stud 1, its other end telescoping freely in the pipe stud 2. The pipe section 3 is of such length that it will at all times, even at the maximum contraction of the pipes, be housed in the pipe stud 2, thus effectually preventing scale and other impurities from entering into the spaces enclosed by the diaphragms, as will be hereinafter more fully pointed out.

The pipe section 3 forms a riding support for a center ring 4 which is located between the pipe studs 1 and 2. Between the pipe studs and the respective adjacent ends of the center ring 4 are located casings indicated, generally, by the reference-numeral 5. Each of the casings 5 consists of side walls 6 and a peripheral wall 7 which is secured to the outer peripheries of the respective side walls by suitable bolts 8.

In each of the casings 5 I have provided a pair of circular flexible corrugated diaphragms 9, which at their outer peripheries are secured to the casing at the joint between the side walls 6 and the peripheral wall 7, the diaphragms being provided with suitable apertures for the passage of the bolts 8 therethrough. The inner periphery of the diaphragms surrounds the pipe section 3 and is secured to the pipe studs or the center ring 4, as the case may be, by means of annular securing members 10 which are rigidly connected to the pipe studs or center ring 4 by means of bolts 11. The diaphragms are provided with apertures for the passage of the said bolts 11, as is clearly illustrated in Fig. 1.

Series of backing plates 12 are provided for each of the diaphragms 9, these backing plates being supported at their inner edges in an annular depression 13 formed in the pipe studs 1 and 2 and in the center ring 4. At their outer edges, the backing plates are supported in recesses 14 formed at the top of the side walls 6. Each of the backing plates of a series is of substantially keystone shape, as clearly illustrated in Fig. 2, and the adjacent plates are maintained in proper spaced relation by means of pins 15 which are rigidly secured in the pipe studs, the center ring 4, and in the side walls 6 of the respective casings.

In the operation of an expansion joint of this type, it is of course understood that the flexible diaphragms 9 assume a more or less conical or frusto-conical form, and that this form varies in accordance with the expansion or contraction of the pipe line. The diaphragms are therefore constantly subjected to flexures, by reason of which their form is varied, and it is therefore necessary that the diaphragms be made of material which will withstand a great number of such flexures. I have found that, in actual practice, diaphragms made of heat- and corrosion-resisting material, such as nickel-steel alloys, are highly satisfactory for this purpose, and that diaphragms of such material will outlast in service diaphragms of copper or other ductile material heretofore employed.

The backing plates 12 form a support for the diaphragms 9, but they are not sufficient to relieve the strain on the diaphragm caused by their constant flexure. I have therefore provided additional reinforcing means in the form of concentric rings 16 which are interposed between the backing plates 12 and the diaphragms 9, and which rings fit in the corrugations of the diaphragms.

As heretofore stated, an object of the invention is to provide an expansion joint in which any number of flexible diaphragms may be employed and in which means are provided for limiting the movement of each of said diaphragms so that all of the expansion or contraction in the pipe line is not taken up by only one of the diaphragms but is equally distributed to all of them. For this purpose, the casings 5, the pipe studs 1 and 2, and the center ring 4 are provided with suitable stops for limiting the movement of the diaphragms. As will be seen from an inspection of Fig. 1, the pipe studs 1 and 2 are provided with stop rings 17 and 18. These rings may be either continuous or may be notched as indicated in Fig. 3. The side wall 6 of each of the casings 5 which surrounds the pipe studs 1 or 2 is located between the stops 17 and 18, and its inside periphery 20 may be notched similarly to the rings 17 and 18. This arrangement is made for the purpose of ease in assembling the joint, the projections on the ring 18 being passed through the notches in the side wall 6, after which the parts are turned one relative to the other so as to bring the projections in register, as shown in Fig. 3.

The center ring 4 is provided intermediate its ends with a stop ring 19, and adjacent its ends are provided additional stop rings 21. From an inspection of Fig. 1, it will be noted that the adjacent side walls 6 of the respective casings 5 are located between the center stop ring 19 and the outer stop rings 21.

From the construction just described, it is believed that the operation of my device will be clear, particularly with reference to the equal distribution of the expansion in the line upon the several flexible diaphragms 9. Upon expansion in the line, the pipe studs 1 and 2 will move towards each other, thus permitting the pipe 3 to telescope further into the pipe stud 2. Such movement continues until the stop rings 17 contact with the side walls 6 of the casings. Similar movement takes place at the other side of the casing, until the side wall 6 contacts with the center stop 19 on the ring 4. Upon contraction, the opposite action takes place; that is to say, the pipe studs 1 and 2 separate and such movement continues until the stop rings 18 contact with the side walls 6, thus effectually limiting the amount of movement of the flexible diaphragms 9 and distributing the expansion or contraction of the pipe equally on all of the diaphragms.

While I have illustrated in the drawings an expansion joint which includes two casings in each of which is located a pair of flexible diaphragms, it will now be understood that any desired number of such casings may be joined in series. For this purpose, a center ring similar to the ring 4 may be substituted for either one of the pipe studs 1 and 2, a casing similar to the casing 5 is then inserted adjacent the said ring, and then a pipe stud. By this arrangement, therefore, an expansion joint including any number of flexible diaphragms may be constructed and by reason of the provision of the stops heretofore described, it will be understood that the amount of expansion or contraction of the pipe will be compensated for by equal distribution thereof upon all of the diaphragms. It will readily be appreciated by those skilled in the art that, by such an arrangement, all of the expansion joints necessary to take care of a considerable length of pipe may be located in one place which will be readily accessible, as, for example, through a suitable manhole, and, thus, the expense of separate installations of expansion joints at several places along the length of the pipe is avoided. Consequently, by my construction a great saving of space and expense is effected and, at the same time, a joint is provided which effectually provides for compensation for expansion and construction of relatively great length of pipes.

It is to be understood, of course, that the materials employed in the construction of the joint described are such as to offer great resistance to heat and high pressures. Furthermore, the arrangement disclosed in the drawings and described in the foregoing is such that scale and impurities cannot collect in the casings from time to time, as in joints constructed in accordance with prior practice.

It will also be understood by those skilled in the art that the construction of the diaphragms of such heat- and pressure-resisting material as nickel-steel alloy provides a diaphragm which will withstand a great many flexures without acquiring a set, as is the case where ductile metals, such as copper, are employed. Also, long life of the diaphragms is assured by reason of the interposition of the reinforcing rings between the diaphragms and the backings, whereby overstraining of the diaphragms due to the varying pyramidal formation of the backing plates is obviated.

I claim:

1. In an expansion joint, a pair of pipe studs, a pipe section secured to one of said pipe studs and telescoping in the other, a ring surrounding said pipe section, casings connecting said ring to said pipe studs, and flexible diaphragms in said casings.

2. In an expansion joint, a pair of pipe studs, a pipe section secured to one of said pipe studs and telescoping in the other, a ring surrounding said pipe section, casings connecting said ring to said pipe studs, flexible corrugated diaphragms in said casings, and a series of backing plates for supporting said diaphragms.

3. In an expansion joint, a pair of pipe studs, a pipe section secured to one of said pipe studs and telescoping in the other, a ring surrounding said pipe section, casings connecting said ring to said pipe studs, flexible corrugated diaphragms in said casings, a series of backing plates for supporting said diaphragms, and reinforcing means interposed between said backing plates and said diaphragms.

4. In an expansion joint, a pair of pipe studs, a pipe section secured to one of said pipe studs and telescoping in the other, a ring surrounding said pipe section, casings connecting said ring to said pipe studs, flexible corrugated diaphragms in said casings, a series of backing plates for supporting said diaphragms, and concentric reinforcing rings interposed between said backing plates and said diaphragms, said rings fitting in the corrugations of said diaphragms, and cooperating with said backing plates to support said diaphragms.

5. An expansion joint for pipe-lines subjected to varying temperatures, including a pair of pipe studs, a pipe section secured to one of said pipe studs and telescoping in the other, a ring surrounding said pipe section, casings connecting said ring to said pipe studs, flexible diaphragms in said casings adapted to move upon expansion and contraction of the pipe-line, and means to limit the expansive and contractive movement of said diaphragms.

6. An expansion joint for pipe-lines subjected to varying temperatures, including a pair of pipe studs, a pipe section secured to one of said pipe studs and telescoping in the other, a ring surrounding said pipe section, casings connecting said ring to said pipe studs, flexible diaphragms in said casings adapted to move upon expansion and contraction of the pipe-line, and stops on said pipe studs and said ring to limit movement of said diaphragms.

7. An expansion joint for pipe-lines subjected to varying temperatures, including a pair of pipe studs, a pipe section secured to one of said pipe studs and telescoping in the other, a ring surrounding said pipe section, casings having side walls interposed between said ring and said pipe studs, flexible diaphragms in said casings, and pairs of stops on said pipe studs and said ring, the inner periphery of the side walls of said casings surrounding said ring and said pipe studs and being confined between the stops of the respective pairs.

8. An expansion joint for pipe-lines subjected to varying temperatures, including a pair of pipe studs, a pipe section secured to one of said pipe studs and telescoping in the other, a ring surrounding said pipe section, casings interposed between said ring and said pipe studs, flexible diaphragms in said casings adapted to move upon expansion and contraction of the pipe-line, stops on said pipe studs cooperating with the outer walls of said casings to limit movement of said diaphragms, and a stop on said ring common to the adjacent walls of said casings.

9. An expansion joint for pipe-lines subjected to varying temperatures, including a pair of pipe studs, a pipe section secured to one of said pipe studs and telescoping within the other, a ring surrounding said pipe section, casings interposed between said ring and said pipe studs, a pair of flexible diaphragms in each of said casings, the outer peripheries of the diaphragms being secured to said casings, means to secure the inner periphery of one of the diaphragms of each pair to one of said pipe studs, and means to secure the inner periphery of the other diaphragm to said ring.

10. An expansion joint for pipe lines subjected to varying temperatures, including a pair of pipe studs, a pipe section secured to one of said pipe studs and telescoping in the other, a ring surrounding said pipe section, casings having side walls interposed between said ring and said pipe studs, flexible diaphragms in said casings, and means to limit movement of said diaphragms, said means including pairs of stops on said ring and said pipe studs, said stops comprising projections and notches, the inner periphery of the side walls of said casings surrounding said ring and said pipe studs and being provided with projections and notches similar to said stops, whereby the projections on the side walls register with the projections on said stops and are confined therebetween.

11. In an expansion joint, a pair of pipe studs, a pipe section secured to one of said pipe studs and telescoping in the other, a ring surrounding said pipe section, and casings slidably mounted on said pipe studs and said ring.

12. In an expansion joint, a pair of pipe studs, a pipe section secured to one of said pipe studs and telescoping in the other, a ring surrounding said pipe section, casings slidably mounted on said pipe studs and said ring, and means on said pipe studs and said ring for limiting the sliding movement of said casings.

13. In an expansion joint, a pair of pipe studs, a pipe section secured to one of said pipe studs and telescoping in the other, a ring surrounding said pipe section, pairs of stops on said ring and said pipe studs, and casings surrounding said pipe studs and said ring and having side walls confined between the stops of said pairs.

In testimony whereof I, affix my signature.

ROBERT HALL.